(No Model.) 2 Sheets—Sheet 1.
E. GIROUX.
CAR BRAKE AND STARTER.
No. 359,386. Patented Mar. 15, 1887.
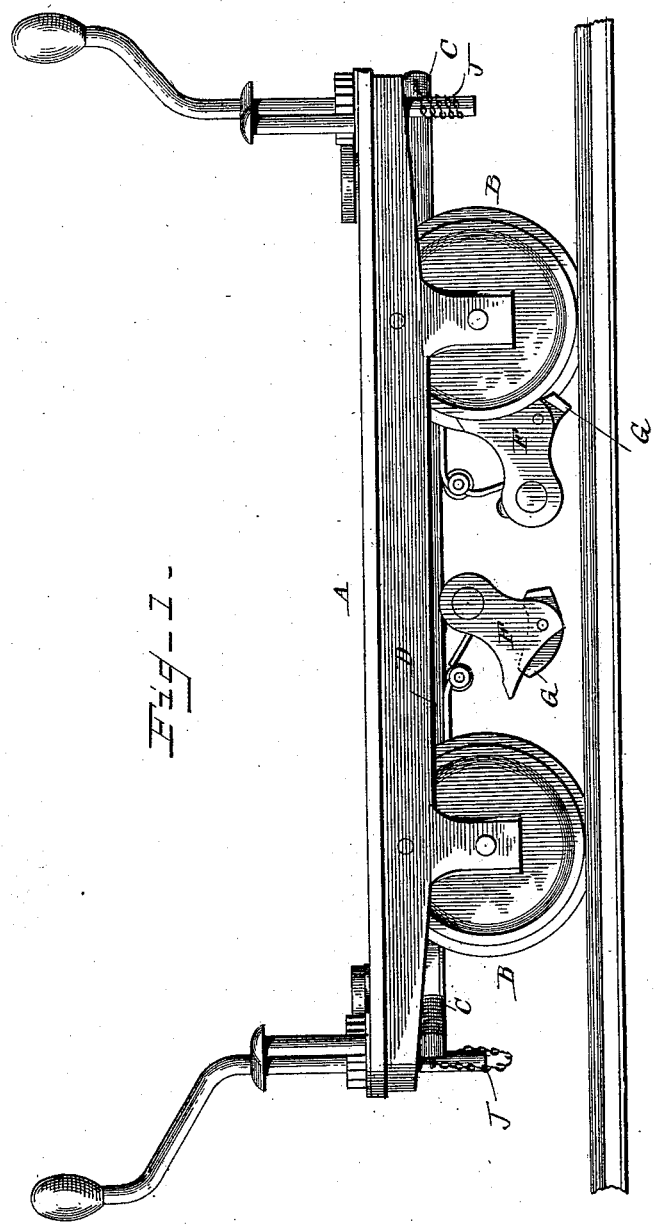

(No Model.) 2 Sheets—Sheet 2.
E. GIROUX.
CAR BRAKE AND STARTER.
No. 359,386. Patented Mar. 15, 1887.
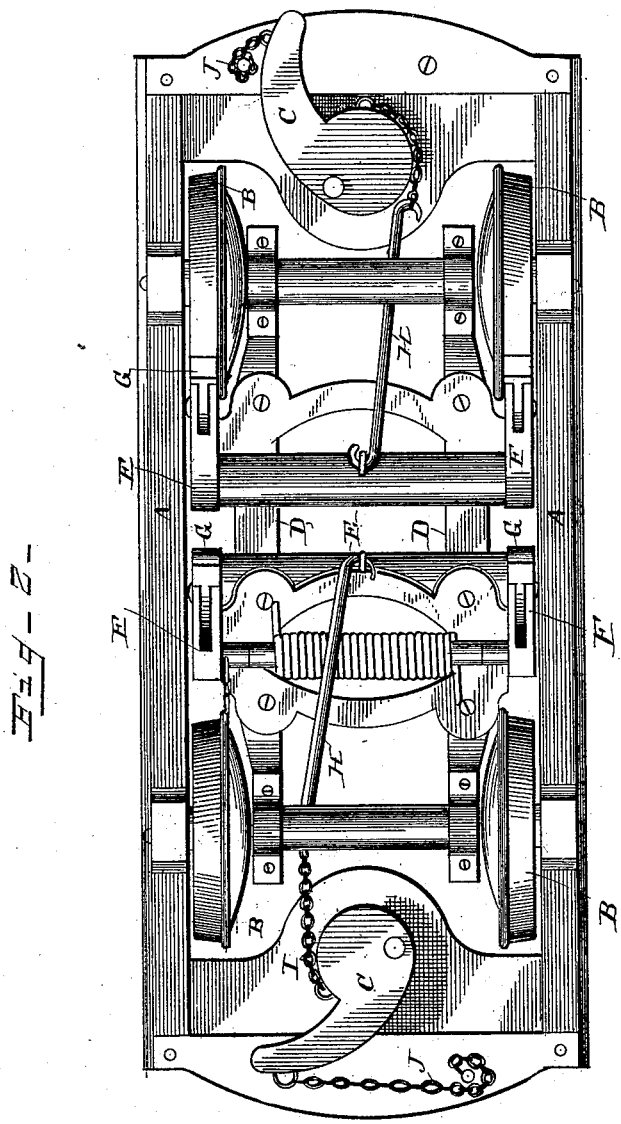
Witnesses
Edwin L. Yiwee
Wm. F. Huntemann
Inventor
Elzear Giroux

UNITED STATES PATENT OFFICE.

ELZEAR GIROUX, OF WOBURN, MASSACHUSETTS.

CAR BRAKE AND STARTER.

SPECIFICATION forming part of Letters Patent No. 359,386, dated March 15, 1887.

Application filed December 22, 1886. Serial No. 222,319. (No model.)

*To all whom it may concern:*

Be it known that I, ELZEAR GIROUX, of Woburn, in the county of Middlesex and State of Massachusetts, have invented certain Improvements in Car Brakes and Starters, of which the following is a specification.

This invention relates to certain improvements in car brakes and starters; and it has for its object to provide an attachment for cars whereby a car may be effectually stopped and started by a device simple in construction, cheap, and substantial. These objects I attain by the means illustrated in the accompanying drawings, in which—

Figure 1 represents a side elevation of my invention, and Fig. 2 a bottom view thereof.

In the drawings, the letter A indicates the platform of an ordinary street-car, mounted upon the wheels B, and having also the usual brake-handles provided with the pawl and ratchet at the platform to hold the brake to its position against the wheels and the usual extension below the platform on which the chain is wound.

Pivoted eccentrically to the bottom of the car are the irregular cams C, one at each end. Resting upon the car-wheel axles is the frame D, having secured thereto one side of a spring-hinge, the other side being secured to a cross-bar, E, having at each end the slotted brake-shoes F, in the slot of which are the pivoted dogs G, one end of which is enlarged.

The irregular cams mentioned above are connected to the cross-bars E by means of the rods H and short chains I, and the brake-operating handles are connected to the irregular cams by the chains J. The purposes of these described parts will be hereinafter described.

The operation of my invention is as follows: To stop the car, the operator turns the handles, winding the chain attached thereto around its lower end, turning the irregular cam upon its pivot, drawing the brake-shoes toward the car-wheels through the medium of the short chains and rods, and when the brake-shoes are traveling in the forward direction the pivoted dogs, being weighted by their enlarged ends, fall by gravity, striking the ground, but, giving freely, allow the shoes to press against the wheels; but when the brake-handles are released the spring-hinge draws the mechanism toward its normal position, when in the backward motion of the brake-shoes the pivoted dogs impinge the track, forcing the car forward, thereby taking off the strain forced upon the horses attached to the car when starting.

Having thus fully described my invention, what I claim, and desire to secure by Letters Patent, is—

A car brake and starter consisting of a spring-hinge, a cross-bar having slotted brake-shoes thereon, with pivoted dogs therein, and the irregular cams pivoted eccentrically to the bottom of the car and attached to the brake-handles and shoe-supporting bars by suitable means, substantially as described.

ELZEAR GIROUX.

Witnesses:
E. C. INGALLS,
CHARLES E. SMITH.